United States Patent [19]
Stella

[11] 3,748,994
[45] July 31, 1973

[54] PHOTOGRAPHIC FILM CASSETTE HAVING AN IMPROVED FILM-ENGAGING PAD FOR FILM PROCESSING

[75] Inventor: Joseph A. Stella, Peabody, Mass.

[73] Assignee: Polaroid Corporation, Cambridge, Mass.

[22] Filed: June 14, 1972

[21] Appl. No.: 262,654

[52] U.S. Cl. .................. 95/89 R, 118/415, 352/130
[51] Int. Cl. .................. G03d 5/06
[58] Field of Search .................. 95/89 R, 13; 118/407, 415; 352/130, 224

[56] References Cited

UNITED STATES PATENTS

| | | | |
|---|---|---|---|
| 2,948,209 | 8/1960 | Neidle et al. | 95/89 R |
| 3,618,506 | 11/1971 | Kitrosser | 95/89 R |
| 3,623,417 | 11/1971 | Eloranta et al. | 95/89 R |
| 3,643,579 | 2/1972 | Downey et al. | 95/89 R |

*Primary Examiner*—Fred L. Braun
*Attorney*—Robert L. Berger, Brown and Mikulka et al.

[57] ABSTRACT

A photographic film cassette having a processing station configured to dispense processing fluid to the film strip following exposure of the latter includes a pressure pad member having a precision surface of minimum area configured to support incremental portions of the photographic film strip during the application of the fluid. Preferably, the processing station includes a nozzle having a film-engaging land which includes side portions extending from the nozzle opening in supporting engagement with the film margins during fluid application so as to thereby minimize fluctuations of film portions just subsequent to the application of the fluid, and the pressure pad includes a substantially U-shaped surface which generally conforms to the nozzle opening and its film engaging land.

20 Claims, 10 Drawing Figures

30
77
78
61
93
22
95
47
95
84
72
79
74

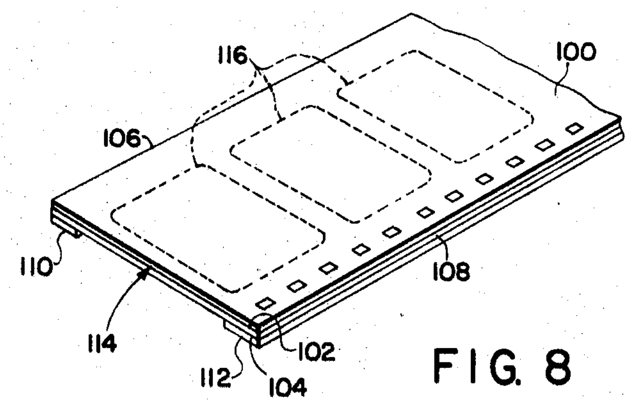
FIG. 8
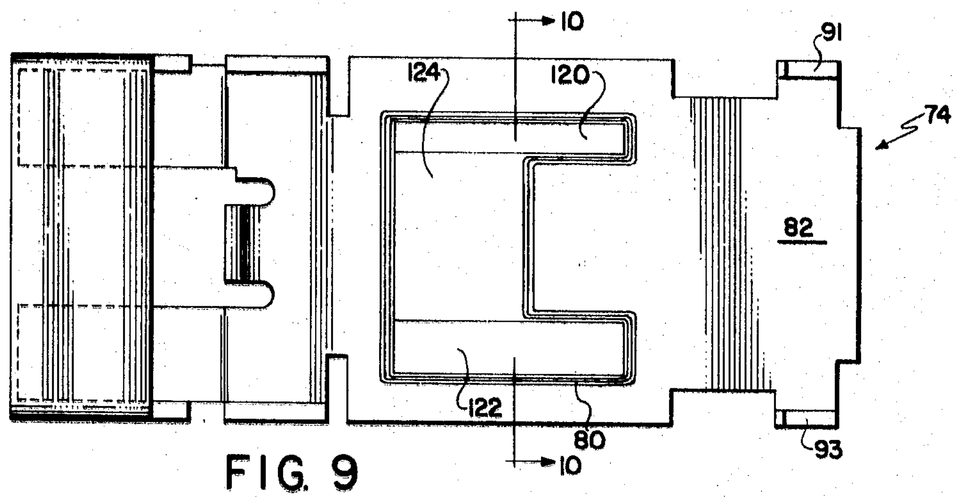
FIG. 9
91 120 124 122 93
FIG. 10

PHOTOGRAPHIC FILM CASSETTE HAVING AN IMPROVED FILM-ENGAGING PAD FOR FILM PROCESSING

BACKGROUND OF THE INVENTION

1. Field of the Invention

This invention relates to photographic film cassettes and more particularly to a multipurpose film cassette having an improved film processing system.

2. Description of the Prior Art

As a result of recent developments in the motion picture art, a photographic system has been devised by which a supply of photographic film contained in a cassette can be exposed in a camera adapted to receive the cassette, and then processed to provide viewable images by placing the cassette in a viewing apparatus, capable of activating a processor also contained in the cassette such that during rewinding the exposed film, a layer of processing fluid is deposited along the length of the film. After processing in this manner, the viewing device is operated as a projector to advance the film incrementally frame by frame past a light source so that the scene to which the film was exposed is reproduced for viewing.

Exemplary of such systems are those described in prior U. S. Pat. No. 3,615,127 of Edwin H. Land issued Oct. 26, 1971; U.S. Pat. No. 3,623,417 of Vaito K. Eloranta et al. issued Nov. 30, 1971; and the commonly assigned copending patent application, Ser. No. 227,092 of John F. Batter, Jr. et al., filed Feb 17, 1972. In these systems, the film strip is advanced through a processing station which deposits a coating of processing fluid along the length of the film and preferably effects a diffusion transfer of a negative image in a light sensitive emulsion layer to a positive image receiving layer.

It is imporatnt to the satisfactory operation of the applicator arrangement, that the processing fluid be deposited uniformly on the film, and failure to achieve such a uniform layer will result in undesirable blemishes which may be observed during projection of the processed film. Preferably, the processing fluid is dispensed through a nozzle opening as incremental sections of the film are progressively advanced thereby. Consequently, it is critical that the progressively advanced, incremental portions of the film be held in a substantially coplanar relationship as the processing fluid is deposited thereon. As noted in the aforementioned copending application, the latter may be accomplished by a pressure pad member having a precision surface configured for supporting the incremental sections of the film in a predetermined plane as they are transported across the nozzle.

This problem of achieving a uniform layer or coating of the fluid on the film is complicated by the requirement that each cassette carry its own processor and further by the fact that the cassette and its components including the processing station must be capable of mass production techniques and be compatible with the tolerance levels incident to such techniques in order for the system to perform satisfactorily. Hence, it can be appreciated that the design and structural organization of the means by which the processing fluid is distributed onto the film during the processing operation is extremely critical to the overall system in which the cassette is employed.

SUMMARY OF THE INVENTION

In accordance with the present invention, the multipurpose film handling cassette includes a processor having a nozzle opening through which processing fluid is applied to the emulsion surface of the film strip as the latter is transported across the nozzle. In this arrangement incremental sections of the film are sandwiched between the nozzle surface and a pressure pad configured to generally conform to the nozzle surface. In the illustrated embodiment, the nozzle opening is enclosed by a U-shaped film-engaging land having leg portions extending along the film margins in the direction of film travel so as to provide supporting engagement with the film for a fixed length of its travel from the nozzle, and the pressure pad includes a precise film-engaging surface of reduced area which generally conforms to the film-engaging land and the nozzle opening. The area of film-engaging surface of the pressure pad, which is held to a very close tolerance, is minimized by making the pad surface U-shaped similar to the nozzle land, and includes a traverse portion which underlies the nozzle opening and leg portions which underlie and substantially conform to the legs of the nozzle land. Hence, although the precision surface of the pad is minimized so as to make the structure economically feasible, it nevertheless functions to suitably maintain each incremental section of the film in a generally planar arrangement as they traverse the applicator nozzle.

Consequently, an important object of this invention is to provide an improved multipurpose film cassette having a fluid applicator system including a unique pressure pad arrangement for holding the photographic film strip in engagement with the applicator nozzle during application of the developing fluid.

Another primary object of this invention is to provide a film handling cassette and applicator of processing fluid including an economical pressure pad arrangement for supporting the film strip during fluid application.

A further object of this invention is to provide an improved pad arrangement for supporting the film in engagement with a fluid applicator.

BRIEF DESCRIPTION OF THE DRAWINGS

The novel features that are considered characteristic of the invention are set forth with particularity in the appended claims. The invention itself, however, both as to its organization and its method of operation together with additional objects and advantages thereof will best be understood from the following description of the preferred embodiment when read in connection with the accompanying drawings wherein like numbers have been employed in different figures to denote the same parts and wherein:

FIG. 8 is a fragmentary view in perspective of an alternate film structure for use in the cassette system shown in FIG. 1;

FIG. 9 is a plan view of a pressure pad member intended for use with the film structure shown in FIG. 8; and FIG. 10 is a view in section of the pressure pad member taken along the line 10—10 of FIG. 9.

DESCRIPTION OF THE PREFERRED EMBODIMENT

Figures 1, 2:
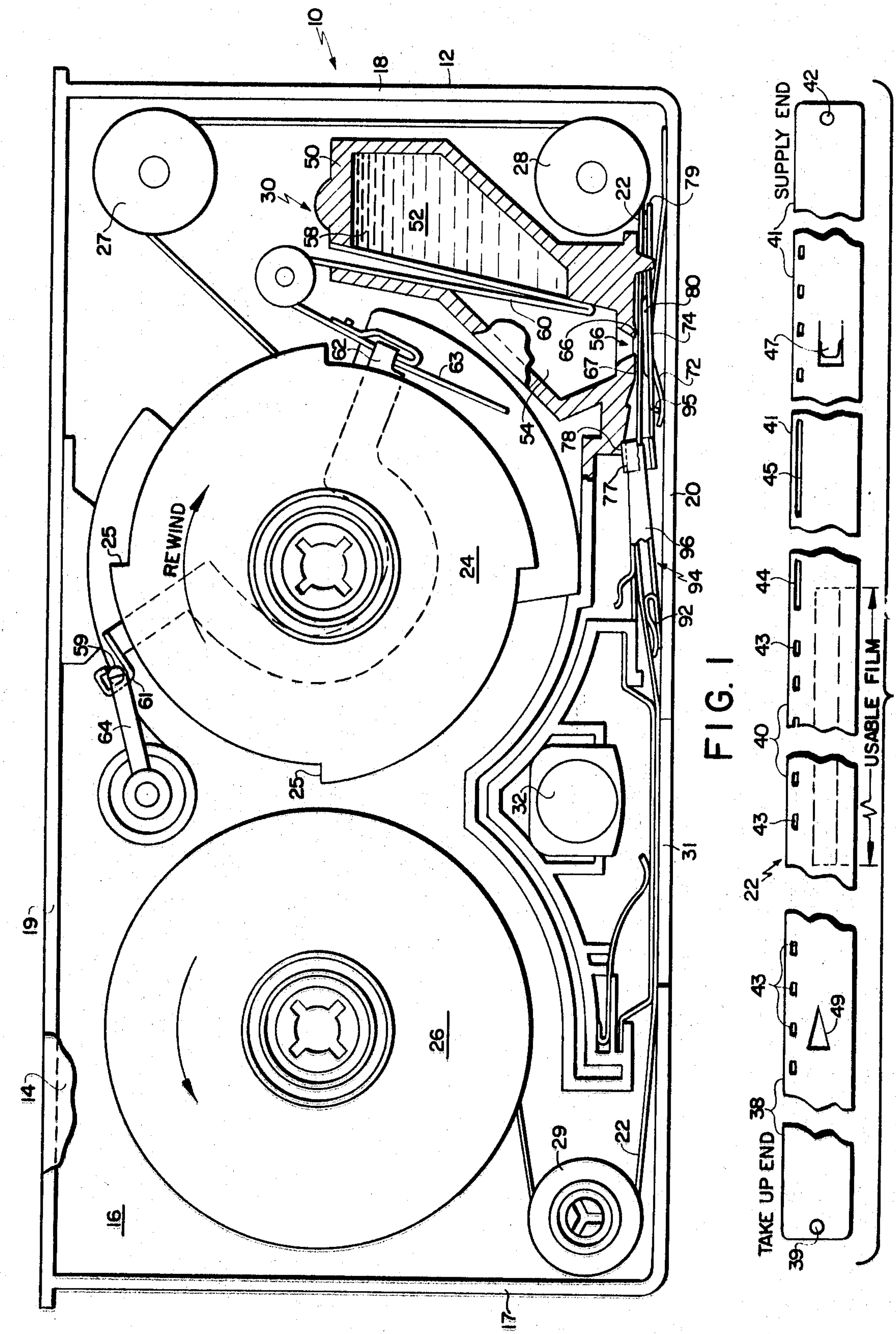
FIG. 1 is a diagrammatic plan view of a motion picture film handling cassette embodying the present invention.
FIG. 2 is a fragmentary plan view of the film strip employed in the cassette shown in FIG. 1.

The illustrated embodiment of this invention, which may be best understood by first referring to FIG. 1 of the drawing, employs a multipurpose film handling cassette 10 of the type described in the abovementioned copending patent application Ser. No. 227,092 which is configured for substantially automatic processing of the film strip responsive to appropriate transport of the latter within the cassette. In this regard, the cassette of the illustrated embodiment includes an applicator system, later explained in detail, which is operable in accordance with a particular film transport program controlled by a special projector. It should be understood, however, that while the invention disclosed herein is particularly applicable to a cassette of the type described in the copending application, it is not restricted to the same and may, of course, be applicable to other applicator systems.

As shown in FIG. 1, the cassette 10 comprises a generally parallelepiped casing or housing 12 constituted by planar faces or side walls 14 and 16, end walls 17 and 18, and elongated top and bottom edge walls 19 and 20. Carried within the housing 12 is a photographic film strip 22 which as later explained in detail with regard to FIG. 2 is permanently attached at one of its ends to a rotatable supply spool or reel 24 from which it extends within the casing 12 in a somewhat extended path around suitable rollers generally designated at 27, 28 and 29 to a take-up spool or reel 26 to which the opposite end of the film is attached. In its path within the casing 12, the film 22 extends across a normally inoperative film processing station 30, which is subsequently explained in detail, and across an opening 31 which functions at different times to facilitate both exposure and projection. For facilitating the latter operation, a prism 32 is mounted behind the film strip 22 in an adjoining relation to both the opening 31 and to an illumination aperture (not shown) of the side wall 14.

Before completing the description of the cassette structure itself, it is advantageous to first describe the film strip 22 which is utilized therein and is illustrated in FIG. 2. As shown in that figure, the strip 22 is viewed from the outer side and comprises a leader 38 terminating at an end formed with an aperture 39 which serves to connect that end of the film to the take-up spool 26. Behind the leader 38 is a strip 40 of photographically useful film upon which projectable images may be formed. Preferably, the film strip 22 comprises a base of any suitable transparent material carrying, at least over the photographically useful length 40, an emulsion or photosensitive coating of any conventional variety, as for example, an emulsion developed by a monobath processing composition to form a positive transparency suitable for projection. Following the photographically useful portion 40 is a trailer region, generally designated at 41, which carries at its end an aperture 42 by means of which that end of the film is configured for connection to the supply spool 24.

Carried along one edge of the film strip 22 are a plurality of sprocket holes 43 which are configured for cooperation with a drive pawl (not shown) in either a camera or projector for incremental advancement of the film. Adjacent the trailing end 41, the series of sprocket holes 43 are interrupted by a first elongated hole 44 which may, for example, span two of the sprocket holes 43. Further along the film, the series of sprocket holes 43 is again interrupted by a second elongated hole 45, longer than the sprocket hole 44, and, for example, spanning three of the sprocket holes 43.

As described in the aforementioned copending patent application Ser. No. 227,092, the first elongated sprocket hole 44 terminates the advance of the film in the camera (not shown) and thereby establishes an exposure end point, whereas the second sprocket hole 45 terminates a film take-up or projection end point in the projection apparatus (not shown). The different termination points are employed since it is preferred to advance the film beyond the exposure end point before applying processing composition to the exposed film, and for that purpose, a double film drive pawl (not shown) is employed in the projector apparatus (not shown) such that the film may be carried beyond the first elongated hole 44 until the second elongated hole 45 is encountered. This further advancement of the film in the projector unit is accomplished in order to bring a detent engaging element or projecting bump 47 into cooperative engagement with a pressure pad element of the processing station 30 as will be subsequently described. Additionally, the leading end 38 of the film strip 22 carries another detent engaging means, here shown as an aperture 49, which serves to actuate a valve member also forming a part of the processing station 30 to be subsequently described.

Referring again to FIG. 1, the film processing station 30 generally comprises a housing 50 having a first compartment or receptacle 58 retaining a source of processing fluid or composition 52 mounted over a second internal chamber 54 which communicates with a coating nozzle generally designated at 56. The fluid 52 is initially retained within the sealed tub-like receptacle 58 by means of a tear-tab 60 which extends from the housing 50 to a tab actuating assembly generally designated at 62. As described in the aforementioned copending patent application, Ser. No. 227,092 the actuating assembly 62, which is biased towards the processor 30 by a spring member 63, extends beneath the spool 24 to an end portion 61 which is configured for engagement with the teeth 25 of the spool. The end portion 61 is retained in an initial position by a post member 59 and is in engagement with a release-cam 64. As later explained in detail, upon insertion of the cassette 10 into the projector (not shown) and operation of the cam 64, the tab actuating assembly 62 is released to bring its end portion 61 into engagement with the spool 24. Then, upon rotation of the film spool 24 in the rewind direction, (clockwise as shown by the arrow in FIG. 1) one of the spool teeth 25 operatively engages the end portion 61 and the actuating assembly 62 is rotated with the spool to draw the tab 60 from the fluid tub 58 and thereby release the retained fluid 52 to the nozzle 56 and the underlying portions of the film 22.

Figure 3:
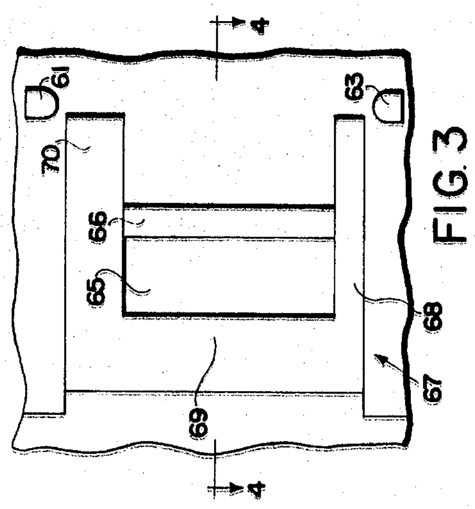
FIG. 3 is a fragmentary plan view of a coating nozzle which forms a part of the cassette shown in FIG. 1.

For suitable application of the fluid 52, the coating nozzle 56 may be formed in a conventional manner, as by a precision molding or the like from a suitable thermoplastic resin selected to form a dimensionally stable and accurate molding whose working surfaces can be kept to close tolerances. As best shown in FIG. 3, wherein the bottom of the nozzle is shown, one of the most critical of these working surfaces forms a plane, generally U-shaped film-engaging land 67 enclosing a nozzle opening 65 at the base of the nozzle. Another critical surface forms a doctor bar 66 which extends across the bend of the U-shaped land 67 and is slightly recessed therein as is more clearly shown in FIG. 4. The depth to which the doctor blade 66 is recessed is greatly exaggerated in this latter figure and generally is selected to be twice the desired thickness to which the coating composition is applied to the film, for example, in the order of 0.001 inch where a processor fluid layer of approximately 0.0005 inch is desired.

Referring again to FIG. 3, the U-shaped land 67 comprises a pair of extended leg members or side members 68 and 70 joined by a lateral member 69. Extending laterally between the two leg members 68 and 70 and parallel to the lateral member 69 is the doctor blade 66. Hence, the latter with member 69 and mutually adjoining portions of the legs 68 and 70 circumscribe the generally rectangular orifice or nozzle opening 65 which communicates with the internal chamber 52. The nozzle 56 is also provided at its sides with depending posts 61 and 63 which provide guidance for the film strip 22 in its travel past the opening 65 and also serves as stops for a pressure pad member as later explained in detail in regard to FIG. 7.

Figure 4:
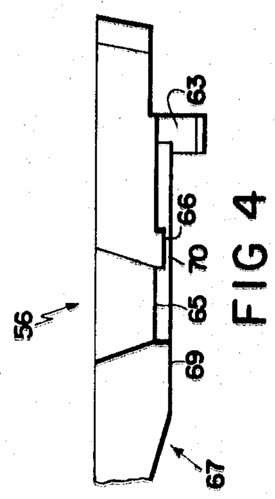
FIG. 4 is a view in section of the coating nozzle taken along the line 4—4 of FIG. 3.

In operation of the cassette 10, as later explained in detail, the processing fluid 52 is dispensed through the orifice 65 as the film is rewound to the supply spool 24, or that is, advanced across the nozzle 65 to the right as viewed in FIGS. 3 and 4. Hence, the lateral member 69 of the nozzle land 67 provides a leading edge of the nozzle 56 during the processing operation, and incremental portions of the film strip are therefore progressively transported from the lateral member 69 across the opening 65 and the doctor blade 66 and then continue along the remainder of the leg members 68 and 70.

Hence, the side members 68 and 70 establish side runners configured to straddle the deposited fluid layer so as to permit formation of a suitable thickness of fluid at the trailing edge of the doctor blade 66, and which additionally cooperate with a pressure pad assembly to be subsequently described so as to maintain the incremental portions of the film strip 22 in a substantially coplanar arrangement just beneath the nozzle opening 65 and for a short length beyond the latter in the direction of film travel during processing. Consequently, the nozzle land 67 and the pad assembly serve to sandwich the film segment between them so as to minimize film distortion during the dynamic application of the fluid.

This maintenance of each incremental section of film in engagement with the nozzle is accomplished by a pressure pad member 74 which is shown in FIG. 1 in the initial position assumed by it upon assembly of the cassette and prior to processing. As shown therein, the film strip 22 normally passes between the nozzle land 67 and above a normally disengaged film-engaging pad surface 80 of the pressure pad 74. The latter is mounted on and biased towards the nozzle land 67 by a leaf spring 72, however, the pad itself is held out of engagement with the film during the initial operation of the cassette 10, for example, during exposure operations, by cooperation of an arm member formed at one end 77 of the pad with a detent 78 of the processor housing 50. In this regard, the pad assembly 74 carries a depending member 95 which engages the spring 72 to reliably retain the pad assembly in its initial position. The other end 79 of the pad 74 is configured to lightly engage the base side of the film strip 22 and to cooperate with the protuberance 47 of the trailing end thereof so as to displace the pad into film engagement as will be subsequently explained.

As previously indicated, the thickness and uniformity of the fluid layer (not shown) which is deposited upon the film strip 22, are a function of the doctor blade distance from the film and the flatness of the latter as it is transported across the nozzle area. Hence, the flatness of the film-enaging areas of both the nozzle and of the supporting pad are highly critical. In keeping with this requirement, both the nozzle land and the film-engaging area of the pad are held to a flatness of 0.0001 inch.

Figure 5:
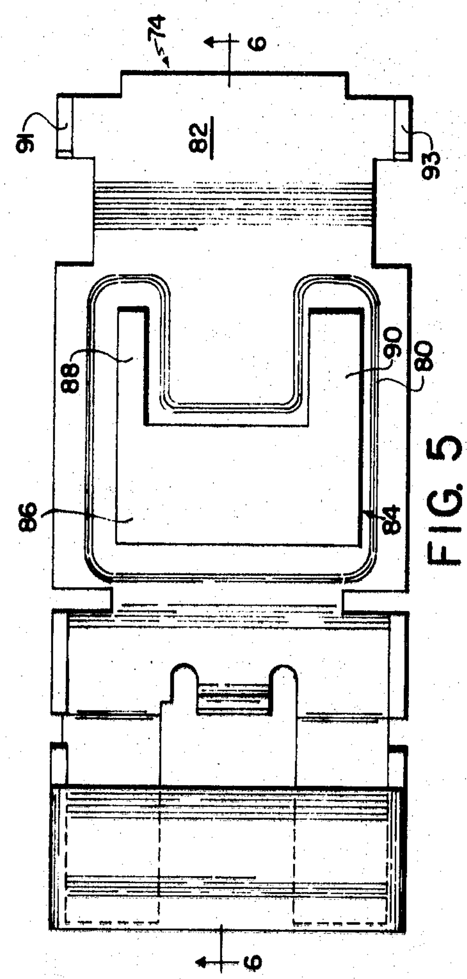
FIG. 5 is a plan view of a pressure pad member comprising part of the cassette shown in FIG. 1.
Figure 6:
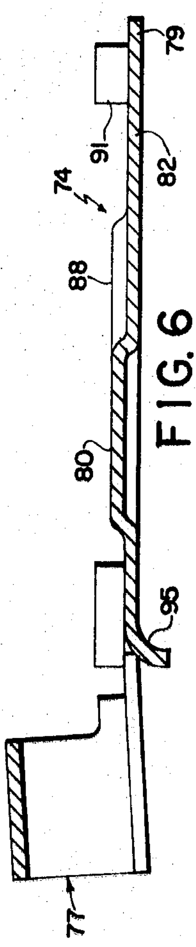
FIG. 6 is a view in section of the pressure pad of FIG. 5, taken along the line 5-5 of FIG. 4.

Advantageously, as subsequently explained, the area of the pad 80 is minimized so as to reduce the manufacturing cost of the latter. In this arrangement, rather than being a generally rectangular surface configured to generally support the film beneath the processing station, the pad is configured to essentially conform to the critical nozzle areas. Hence, as shown more clearly in FIGS. 5 and 6, the film-engaging pad 80 is formed as a raised U-shaped surface, pressed upwardly out of generally flat base plate 82. Of course, the pressure pad assembly 74 may be of any suitable material such as stainless steel or the like, and the raised surface 80 is ground or otherwise precision finished to a planar engaging film surface 84 that is adapted to mate through the film with the plane of the film engaging land 67 and to generally conform to the working area encompassing the rectangular opening 65 through which the composition passes. Carried at the sides of the pad 74 are a pair of upwardly extending posts 91 and 93 which serve to engage the stops 61 and 63 of the nozzle 56 when the pad is displaced to its operative position as subsequently explained. Further, the pad includes a depending hook 95 which as is shown in FIG. 1, cooperates with the pad spring 72 to lightly hold the pad in its initial position.

As previously indicated, the film-engaging surface 84 of the pressure pad 74 is U-shaped similar to that of the film-engaging surface of the nozzle and includes a lateral member 86 which serves to interconnect a pair of spaced side members or runner portions 88 and 90. It should be noted that, the lateral member 86 is of substantially greater length (as measured along the longitudinal axis of the film) than the lateral member 69 of the nozzle land 67 since member 86 is configured to not only underlie member 69 but also the nozzle opening 65 and the doctor blade area 66 and to hold the full width of the film 22 in a coplanar relation as it passes this working area of the nozzle. Then, as the film increment continues past the blade 66 and along the runner members 68 and 70 of the nozzle land, film portions underlying the same are supported by the side runners 88 and 90 of the pad surface 84. Consequently, while the film-engaging surface of the pad is a U-shaped area similar to the nozzle land 67, its lateral member is of greater area than the lateral member of the nozzle inasmuch as it is vital to support the film beneath the nozzle opening 65.

To enable a complete understanding of the fluid applicator and its film-engaging surfaces, exemplary dimensions found to be satisfactory in use are set forth and include a nozzle opening of 0.070 inch, measured longitudinally of the film strip, and a width of 0.225 inch. Desirably, the overall length of the nozzle land 67 is approximately 0.280 inch and its width is 0.320 inch. Within the generally rectangular area bounded by these dimensions, the lateral member 69 is approximately 0.060 inch long as measured along the longitudinal axis of the film. Preferably, the doctor blade measures 0.030 inch along this longitudinal axis, and side members 68 and 70 extend approximately 0.120 inch beyond the trailing edge of the doctor blade. The side members 68 and 70 are spaced apart a distance approximately equal to the nozzle width, for example, 0.225 inch, and it should be noted, that these members are of different width since they are intended to accommodate the different margin widths of the film strip 22. Hence, the side member 68 is approximately 0.022 inch in width, whereas the side member 70 is approximately 0.051 inch wide since the latter is intended to mate with the sprocket margin of the film strip 22. As indicated, the film-engaging surface 84 of the pressure pad 74 is designed to generally conform to the nozzle surfaces. Hence, the surface 84 is generally rectangular in outline and has a width of approximately 0.320 inch and a length of 0.285 inch. The pad portion is raised about 0.015 inch above the surrounding surface and its lateral member 86 extends lengthwise of the pad for a distance of approximately 0.160 inch which coincides with the distance from the leading edge of the land 67 to the trailing edge of the doctor blade 66. Preferably, the extended runners 88 and 90 extend longitudinally a distance of approximately 0.125 inch from member 86 and each are of a size intended to accommodate the side runners 68 and 70 of the nozzle. Hence, the side runner 88 which is intended to mate through the film with the side runner 68 of the nozzle exceeds the width of the latter and is approximately 0.040 inch whereas runner 90 which is intended to mate with runner 70 of the nozzle is 0.070 inch. As can be seen the dimensions of the supporting surface slightly exceed the appropriate dimensions of the land so as to permit sufficient support for the film strip while minimizing the area of the pad which must be finished to a precision flatness. Consequently, in this example, the film-engaging area of the pad which is ground to a flatness of 0.0001 inch is approximately 0.063 sq. in. verses 0.091 sq. in. if it were not U-shaped. The smaller area, of course, provides a significant decrease in cost of manufacture of the pad.

Figure 7:
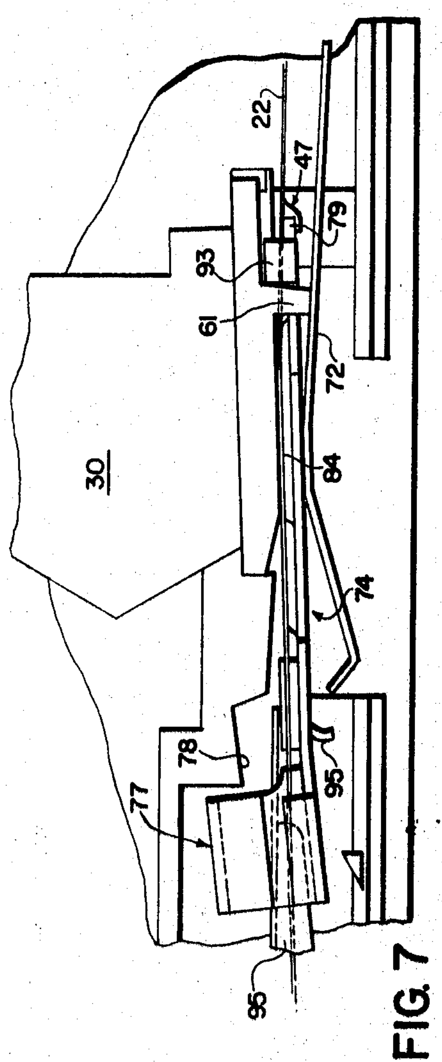
FIG. 7 is a fragmentary view in elevation of the nozzle and pad arrangement of FIG. 1 illustrating the film engaging operation of the pressure pad.

To complete the understanding of the invention, the operation of the film cassette will now be described by initially referring to FIG. 1. As previously indicated, following exposure of the film in a suitable camera, the cassette is placed in a special purpose projector which, as previously indicated, automatically releases the tab actuating assembly 62 into engagement with the spool 24 such that upon rewind of the film, the fluid 52 is dumped to the nozzle 56 and spread over the length of the film strip. Just prior to this release of the fluid, the film is driven slightly further forward in the projector (to the double cutout 45 shown in FIG. 2) at which point the protuberance 47 at the trailing end of the film strikes the pressure pad assembly 74 and drives it to the left until its posts 91 and 93 strike the nozzle stops 61 and 63. At this point, as shown in FIG. 7, the end 77 of the pad assembly 74 is free of the detent 78 and its pad surface 84 is, under the urging of the spring 72, in engagement with the film 22. Consequently, during the rewind operation the film strip 22 is held in engagement with the nozzle land 67. As the rewind operation is completed and substantially all of the film is again coiled on the supply spool 24, the aperture 49 at the leading end of the film is then carried into engagement with an extended arm 92 of a slide valve 94, shown in FIG. 1, which displaces the latter across the nozzle and thereby closes off its opening 65. At the same time, in accordance with a pair of side cams, one of which is shown at 96, the valve 94 displaces the pressure pad 74 downwardly out of film engagement. This completes the processing operation and the film strip 22 is then ready for projection during which drying of the fluid is completed.

In some applications of the cassette system, it is important that the deposited layer of processing fluid be protected from mechanical disturbance until it is dried. Such protection may be provided by use of a stepped film strip having a pair of edge rails, as subsequently explained in regards to FIG. 8, that function to space adjoining turns of the film strip when the latter is wound in its wetted condition on the supply spool. Hence, in an alternate embodiment of the system, a stepped film strip 100 as shown in FIG. 8 is employed. Except for the addition of the margin rails to be subsequently described, the film strip 100 is substantially identical to that shown in FIG. 2 and is designed to operate the processor station 30 in the manner previously described. Hence, although not shown in this figure it is to be understood that the film strip 100 includes the elongated sprocket holes and the pad actuating means of the film strip 22.

As shown in FIG. 8, the film strip 100 is made up of an emulsion surface or layer 102 and a base layer 104. Carried on the underside of the base layer 104 and extended along its margins 106 and 108 are a pair of elongated protuberances or rails 110 and 112, respectively. These rails 120 and 112 are, for example, 0.0015 inch thick so as to slightly exceed the 0.001 inch thick fluid coating and are laterally spaced apart a distance equal to or slightly exceeding the width of the intermediate portion 114 of the emulsion layer 102 on which image frames 116 are to be formed. Hence, when the film strip 110 is wound on the supply spool the rails 110 and 112 straddle the intermediate portion of the emulsion of an adjacent convolution so as to hold the latter portion from contact with the film base and thereby avoid disturbance of the layer of processing fluid.

The provision of the rails 110 and 112 on the base side of the film, however, enhances the probability of transverse film deflection during the fluid application where a conventional, planar pressure pad is employed. As described in the commonly assigned copending U. S. patent application Ser. No. 214,919 of Edward F. Burke and Douglas B. Holmes, filed on Jan. 3, 1972, this latter problem can be overcome by contouring the pressure pad to conform to the underside of the film strip. Consequently, as shown in FIGS. 9 and 10, the pad assembly 74, while it retains the U-shaped configuration of its film engaging surface is modified so as to supportingly engage both the rails 110 and 112 and the intermediate portion 114 of the film as the latter is transported past the nozzle. In this embodiment, the film engaging, U-shaped pad 80 of the base plate 82 includes a pair of coplanar leg surfaces or side runners 120 and 122 depressed slightly below a lateral surface 124 which completes the U-shaped land. Consequently, the film engaging pad 80 essentially provides a stepped support having a first level formed by the planar surface 124 that supports the intermediate portion 114 of the film in a coplanar arrangement beneath the nozzle opening 65 and its doctor blade 66 (shown in FIGS. 3 and 4) and a second level formed by the leg surfaces 120 and 122 which are configured to engage the film rails so as to support the margins 106 and 108 of the film in this plane as the latter is advanced across the length of the nozzle runners 68 and 70.

As in the previously described embodiment, the planar surface 124 is ground flat within 0.0001 inch. Similarly, the pair of runner surfaces 120 and 122 are also held coplanar with each other and ground flat within 0.0001 inch. However, the latter surfaces 120 and 122 are positioned 0.0015 inch below the surface 124 thereby engaging the rails 110 and 112 as the film sections are progressively advanced past the nozzle.

Hence, while the pad arrangement of the alternate embodiment no longer provides a single planar surface for film engagement, it should be understood that it nevertheless retains the minimized pad area inasmuch as the centrally located, pad surface 124 is configured to extend to only the trailing edge of the doctor blade. Stated otherwise, the precision surface is eliminated in the area between the trailing ends of the runner surfaces 120 and 122 so as to retain the substantially U-shaped structure and the economies realized thereby.

It will be seen that by this invention there is provided an improved photographic film cassette and fluid applicator which efficiently treats photographic film following its exposure and includes an economical supporting member having a precision surface of minimum area configured to adequately support the film beneath an applicator nozzle. The supporting member includes a raised U-shaped surface which generally conforms to the working area of the nozzle and provides a flat, precision surface of reduced cost.

Certain dimensions have been indicated in this specification in order to impart a full understanding of the invention. However, it is to expressly be understood that these dimensions are exemplary only and are not to be interpreted as restricting the scope of this invention in any manner.

It should be understood that this invention may be practiced or embodied in still other ways without departing from the spirit or essential character thereof. The preferred embodiments described therein are therefore illustrative and not restrictive, the scope of the invention being indicated by the appended claims and all variations which come within the meaning of the claims are intended to be embraced therein.

What is claimed is:

1. A photographic film cassette comprising a housing configured for receiving a photographic film strip;

means for applying a layer of processing fluid over a length of such film strip including a nozzle having an opening therein through which such processing fluid may be expressed to successive incremental sections of such film strip as such sections are progressively advanced thereacross; and means for supporting such incremental sections in a predetermined plane as they are progressively advanced across said nozzle opening including a support member having a precision finished, film engaging surface of minimum area configured to support substantially the full width of such sections in said plane as they advanced across said opening and to additionally support only the margins of such sections for a predetermined distance beyond said opening.

2. The cassette of claim 1 wherein said film engaging surface of said support member is a U-shaped surface having its leg portions aligned substantially parallel with the axis of such film strip and configured for supporting such margins thereof.

3. The cassette of claim 1 wherein said nozzle includes a U-shaped film-engaging surface, said support member is configured for supporting said film strip in engagement with said nozzle surface, and said film engaging surface of said support member is similarly U-shaped.

4. The cassette of claim 1 wherein said nozzle includes a film-engaging surface disposed around said opening so as to provide a fluid applying area and a pair of spaced parallel surface portions extending therefrom in the direction of advancement of such film increments during the application of such fluid thereto, said pair of surface portions being configured for engaging the lateral margins of such film, and said film engaging surface of said support member includes a substantially planar area conforming to said applying area of said nozzle and a pair of spaced surfaces generally complementary to said spaced pair of nozzle surfaces and configured to support the lateral margins of such film in engagement therewith.

5. The cassette of claim 1 wherein said support member is a plate-like member including a raised U-shaped surface portion precision finished to form a U-shaped film engaging surface.

6. The cassette of claim 5 wherein said raised surface portion is a centrally located portion of said plate bent upwardly to form a generally U-shaped surface.

7. The cassette of claim 1 wherein said nozzle includes a substantially U-shaped film-engaging surface having a pair of spaced parallel side memberrs joined at one end with a lateral member, said nozzle opening being located within said side members in adjoining relation to said lateral member, and said nozzle includes a doctor blade element disposed parallel to said lateral member and on the opposite side of said opening therefrom so as to provide a substantially rectangular enclosure for said nozzle opening, and said support member includes a first film engaging portion substantially conforming to the area bounded by said lateral member, said doctor blade, and the adjoining portion of said side members.

8. The cassette of claim 7 wherein said side members of said nozzle extend a predetermined distance beyond said doctor blade, and said support member includes a pair of spaced film engaging surfaces extending from said first portion for said predetermined distance and configured to generally conform to said side members.

9. The cassette of claim 1 for use with a photographic film strip having a stepped configuration formed by protuberances depending from the margins of such film strip on the side thereof opposite its emulsion, and wherein said support member is contoured in cross-section transverse to the advancement of such film sections to complement the cross-section of such film strip.

10. The cassette of claim 9 wherein said support member includes a first surface portion configured to supportingly engage the film portion intermediate said margins as such incremental sections are progressively advanced across said opening and a pair of surface portions extending from each end of said first surface portion in the direction of advancement of such incremental sections and configured to supportingly engage such protuberances so as to maintain the margins of such incremental sections coplanar with such intermediate portion.

11. An applicator system useful in applying a coating of processing fluid to a strip of exposed photographic material comprising:

a housing defining a reservoir chamber configured for receiving such processing fluid and including a nozzle having an opening through which such processing fluid may be expressed to successive incremental sections of such film strip as such sections are progressively advanced thereacross; and means for supporting such incremental sections in a predetermined plane as they are progressively advanced across said nozzle opening including a support member having a precision finished, film engaging surface of minimum area configured to support substantially the full width of such sections in said plane as they advanced across said opening and to additionally support only the margins of such sections for a predetermined distance beyond said opening.

12. The system of claim 11 wherein said film engaging surface of said support member is a U-shaped surface having its leg portions aligned substantially parallel with the axis of such film strip and configured for supporting such margins thereof.

13. The system of claim 11 wherein said nozzle includes a film-engaging surface disposed around said opening so as to define a fluid applying area and a pair of spaced parallel surface portions extending therefrom in the direction of advancement of such film increments during the application of such fluid thereto, said pair of surface portions being configured for engaging the lateral margins of such film, and said film engaging surface of said support member includes a substantially planar area conforming to said applying area of said nozzle and a pair of spaced parallel surfaces to generally conform said spaced pair of nozzle surfaces and configured to support the lateral margins of such film in engagement therewith.

14. The system of claim 11 for use with a photographic film strip having a stepped configuration formed by protuberances depending from the margins of such film strip on the side thereof opposite its emulsion, and wherein said support member is contoured in cross-section transverse to the advancement of such film sections to complement the cross-section of such film strip, said support member including a first surface portion configured to supportingly engage the film portion intermediate such margins as such incremental sections are progressively advanced across said opening and a pair of surface portions extending from each end of said first surface portion in the direction of advancement of such incremental sections and configured to supportingly engage such protuberances so as to maintain the margins of such incremental sections coplanar with such intermediate portion.

15. A pressure pad for supporting incremental sections of a photographic film strip beneath an applicator of processing fluid which includes a nozzle having an opening therein through which such processing fluid may be expressed to successive incremental sections of such film strip as such sections are progressively advanced thereacross, said pad comprising means for supporting such incremental sections in a predetermined plane as they are progressively advanced across such nozzle opening including a support member having a precision finished film engaging surface of minimum area configured to support substantially the full width of such sections in said plane as they are advanced across such opening and to additionally support only the margins of such sections for a predetermined distance beyond such opening.

16. The device of claim 15 wherein said film engaging surface of said support member is a U-shaped surface having its leg portions aligned substantially parallel with the axis of such film strip and configured for supporting such margins thereof.

17. The device of claim 15 wherein such nozzle includes a U-shaped film engaging surface, said support member is configured for supporting said film strip in engagement with such nozzle surface, and said film engaging surface of said support member is similarly U-shaped.

18. The device of claim 15 wherein such nozzle includes a film engaging surface disposed around such opening so as to provide a fluid applying area and a pair of spaced parallel surface portions extending therefrom in the direction of advancement of such film increments during the application of such fluid thereto, such pair of surface portions being configured for engaging the lateral margins of such film, and said film engaging surface of said support member includes a substantially planar area conforming to such applying area of said nozzle and a pair of spaced surfaces generally complementary to such spaced pair of nozzle surfaces and configured to support the lateral margins of such film in engagement therewith.

19. The device of claim 15 for use with a photographic film strip having a stepped configuration formed by protuberances depending from the margins of such film strip on the side thereof opposite its emulsion, and wherein said support member is contoured in cross-section transverse to the advancement of such film sections to complement the cross-section of such film strip.

20. The device of claim 19 wherein said support member includes a first precision surface portion configured to supportingly engage the film portion intermediate said margins as such incremental sections are progressively advanced across such opening and a pair of precision surface portions extending from each end of said first surface portion in the direction of advancement of such incremental sections and configured to supportingly engage such protuberances so as to maintain the margins of such incremental sections coplanar with such intermediate portion.

* * * * *